(12) United States Patent
Mizuno

(10) Patent No.: US 12,521,614 B2
(45) Date of Patent: Jan. 13, 2026

(54) IMAGE PROCESSING SYSTEM, CONTROL METHOD, AND STORAGE MEDIUM

(71) Applicant: CANON KABUSHIKI KAISHA, Tokyo (JP)

(72) Inventor: Shogo Mizuno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 160 days.

(21) Appl. No.: 18/513,137

(22) Filed: Nov. 17, 2023

(65) Prior Publication Data
US 2024/0173602 A1    May 30, 2024

(30) Foreign Application Priority Data

Nov. 29, 2022  (JP) .................... 2022-190839

(51) Int. Cl.
*A63B 69/00* (2006.01)
*G06T 7/55* (2017.01)
(Continued)

(52) U.S. Cl.
CPC ............ *A63B 69/0002* (2013.01); *G06T 7/55* (2017.01); *G06T 7/73* (2017.01); *G06T 15/10* (2013.01);
(Continued)

(58) Field of Classification Search
CPC ......... A63B 69/0002; G06T 7/55; G06T 7/73; G06T 15/10; G06V 10/255; A63F 13/20; A63F 13/21; A63F 13/213; A63F 13/25; A63F 13/428; A63F 13/46; A63F 13/50; A63F 13/52; A63F 13/53; A63F 13/537; A63F 13/55; A63F 13/56; A63F 13/70
See application file for complete search history.

(56) References Cited

U.S. PATENT DOCUMENTS 8,335,345 B2 * 12/2012 White ................ A63B 24/0021
                                                       348/169
10,188,932 B1 * 1/2019 Fierbaugh .......... A63B 69/0002
(Continued)

FOREIGN PATENT DOCUMENTS

JP      2011161111 A    8/2011
KR     101904240 B1    10/2018

OTHER PUBLICATIONS

Chen, H., "Contour-based strike zone shaping and visualization in broadcast baseball video: providing reference for pitch location positioning and strike/ball judgment," Multimed Tools Appl., 2010, pp. 239-255, vol. 47.

*Primary Examiner* — Omkar A Deodhar
(74) *Attorney, Agent, or Firm* — Canon U.S.A., Inc. IP Division

(57) ABSTRACT

An image processing system includes one or more memories storing instructions, and one or more processors executing the instructions to capture images of a predetermined range by using a plurality of image capturing units, generate object shape information based on a plurality of pieces of image data obtained by the plurality of image capturing units, identify a first position and a second position of the object shape information to calculate object range information, acquire predetermined object information containing a position and a shape of a predetermined object, and generate reference area information based on the object range information and the predetermined object information.

4 Claims, 13 Drawing Sheets

(51) Int. Cl.
*G06T 7/73* (2017.01)
*G06T 15/10* (2011.01)
*G06V 10/20* (2022.01)

(52) U.S. Cl.
CPC ........ *G06V 10/255* (2022.01); *A63B 2220/05* (2013.01)

(56) References Cited

U.S. PATENT DOCUMENTS

| | | |
|---|---|---|
| 11,103,761 B2 | 8/2021 | Divine |
| 11,497,964 B1* | 11/2022 | Hunter ................. A63B 53/005 |
| 2002/0169038 A1* | 11/2002 | Daniel ............... A63B 71/0605 |
| | | 473/451 |
| 2018/0207508 A1* | 7/2018 | Lee .................... A63B 69/0002 |
| 2018/0272224 A1* | 9/2018 | Chen ....................... G06V 40/28 |
| 2020/0009441 A1 | 1/2020 | Divine |
| 2020/0197774 A1* | 6/2020 | Gray, III ............ A63B 71/0622 |
| 2023/0015816 A1* | 1/2023 | Dunn ................. A63B 69/0013 |

* cited by examiner

IMAGE PROCESSING SYSTEM, CONTROL METHOD, AND STORAGE MEDIUM

BACKGROUND OF THE INVENTION

Field of the Invention

The present invention relates to an image processing system that can generate a virtual viewpoint image, a control method, and a storage medium.

Description of the Related Art

In recent years, a technology that performs synchronous image capturing using a plurality of digital cameras installed at different positions has been studied to generate a virtual viewpoint image that can be viewed not only from a viewpoint at the position of each of the digital cameras, but also from an arbitrary viewpoint (e.g., a virtual viewpoint), using a plurality of images obtained from the image capturing by the plurality of digital cameras.

Generation of the virtual viewpoint image based on the plurality of images is performed by gathering the images captured by the plurality of digital cameras in an image processing unit, such as a server, and performing processing, such as rendering, based on the virtual viewpoint in the image processing unit. The virtual viewpoint image is displayed on a display terminal of a user, whereby the user views the virtual viewpoint image. For example, the user views a virtual viewpoint image generated by capturing images of soccer games or baseball games, while freely moving a virtual viewpoint on a playing field in the image. Such a virtual viewpoint image gives the user higher realistic sensation than an image captured simply by a digital camera.

In augmented reality (AR) technology and virtual reality (VR) technology, a virtual object not in the real world is displayed as if the object is in the real world, which allows a viewer to have a new viewing experience. Japanese Patent Application Laid-Open No. 2011-161111 discusses a technology of displaying, on a head-mounted display worn by a chief umpire of baseball games, a reference image indicating a strike zone based on height data about a batter. The reason for using the height data about the batter to display the reference image indicating the strike zone is that, in baseball games, the strike zone varies in accordance with the height and build of a batter.

In the technology of Japanese Patent Application Laid-Open No. 2011-161111, however, a virtual viewpoint image is not discussed, and the strike zone cannot be viewed from a viewpoint other than the viewpoint of the chief umpire. In baseball games, viewers also have desires to visually know whether a strike has been thrown, in particular, when a pitch is close to the boundary of a strike zone. Further, in a virtual viewpoint image, because a user is allowed to view an image from a free position, it is desirable that the strike zone should be viewed from any viewpoint in a case where the reference image indicating the strike zone is displayed on a virtual viewpoint image. As described above, there is an issue that an area that changes in accordance with an object on a virtual viewpoint image, such as the above-described strike zone, cannot be viewed from any viewpoint.

SUMMARY OF THE INVENTION

According to an aspect of the present invention, an image processing system includes one or more memories storing instructions, and one or more processors executing the instructions to capture images of a predetermined range by using a plurality of image capturing units, generate object shape information based on a plurality of pieces of image data obtained by the plurality of image capturing units, identify a first position and a second position of the object shape information to calculate object range information, acquire predetermined object information containing a position and a shape of a predetermined object, and generate reference area information based on the object range information and the predetermined object information.

Further features of the present invention will become apparent from the following description of exemplary embodiments with reference to the attached drawings.

DESCRIPTION OF THE EMBODIMENTS

Exemplary embodiments of the present disclosure will be described below with reference to the drawings. Components described in the following exemplary embodiments indicate merely examples of embodiments, and the present disclosure is not limited only to those components.

Figure 1:
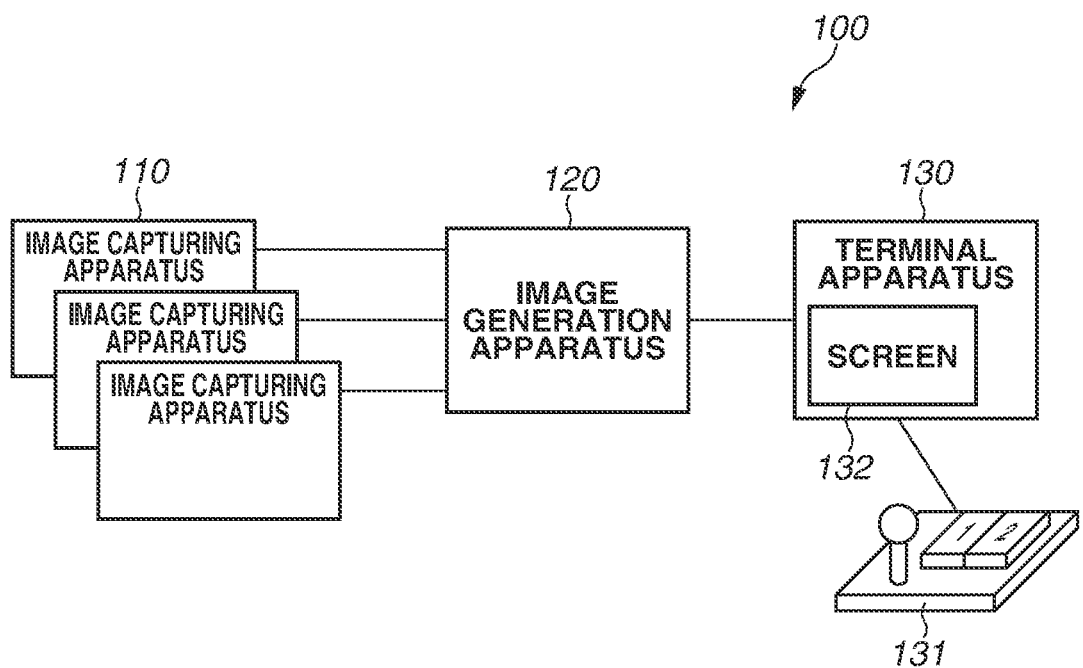
FIG. 1 is a diagram illustrating an image processing system.

FIG. 1 is a diagram illustrating an image processing system 100 according to a first exemplary embodiment.

The image processing system 100 includes a plurality of image capturing apparatuses 110, an image generation apparatus 120, and a terminal apparatus 130. Each of the image capturing apparatuses 110 and the image generation apparatus 120 are connected via a communication cable, such as a local area network (LAN) cable. The communication cable is a cable capable of mutual data communication and is not limited to the example in the present exemplary embodiment.

Figure 2:
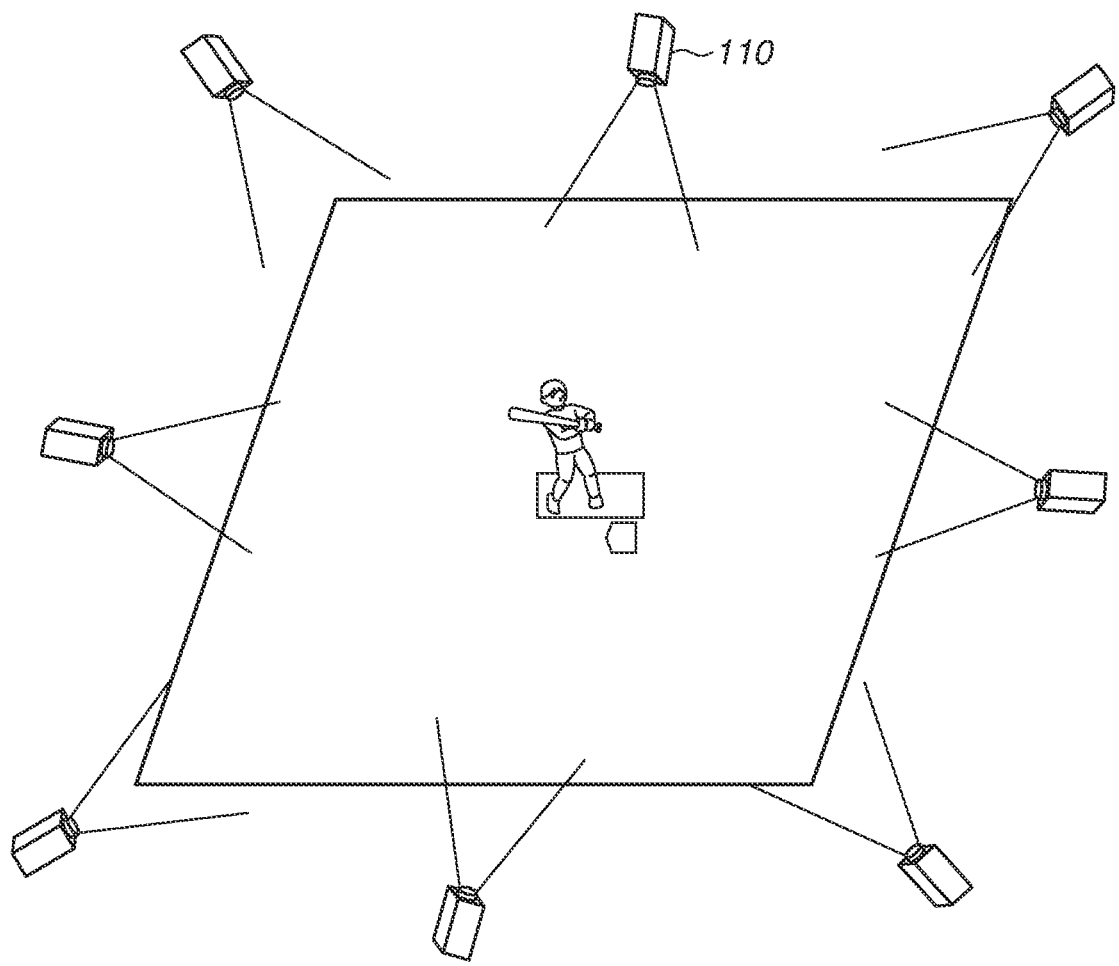
FIG. 2 is a diagram illustrating an example of installation of image capturing apparatuses.

The image capturing apparatus 110 is, for example, a digital camera that captures an image (e.g., a still image and a moving image). FIG. 2 is a diagram illustrating an example of installation of the image capturing apparatuses 110. The image capturing apparatuses 110 are installed to surround a specific area, such as a stadium, and capture images of an object in the area. The captured images are transmitted from the image capturing apparatuses 110 to the image generation apparatus 120.

The image generation apparatus 120 is a server apparatus that generates a virtual viewpoint image. In response to virtual viewpoint information and playback time information input by user operations via the terminal apparatus 130, the image generation apparatus 120 generates a virtual viewpoint image based on captured images, the virtual viewpoint information, and the playback time information. The image generation apparatus 120 accumulates (e.g., records) the images captured by the image capturing apparatuses 110. The virtual viewpoint information contains the three-dimensional position, angle, and the like of a viewpoint (e.g., a virtual viewpoint) virtually present in a virtual space generated from the captured images. The virtual viewpoint information represents a position relative to a predetermined origin position, such as the center of an imaged sports venue (e.g., field). For example, in a case where a virtual viewpoint video image is expressed by xyz coordinates using the center of the sports venue as the origin, the virtual viewpoint information at least contains position information containing xyz coordinates relative to the origin position in a three-dimensional space, and direction information about a viewpoint at the coordinates. The direction information is, for example, angle-related direction information that is expressed in three-dimensional polar coordinates centered on the coordinates contained in the position information. Further, the playback time information is time information about the time of image capturing of the captured image, including an image capturing time and a frame rate (e.g., the number of frames per second). The user designates a playback time and issues an instruction to generate a virtual viewpoint image, whereby a scene at the designated time is generated as a virtual viewpoint image. For example, the number of frames per second is 60. The image capturing time is a time elapsed from when the image capturing is started, or the standard time.

Further, the image generation apparatus 120 has a database function and an image processing function. An image of a scene captured beforehand in a state where an object is not present, such as a state before capturing of an image of the object in the sports venue, is input from the image capturing apparatus 110 as a background image and held (e.g., recorded) in a database. In image capturing of an object is performed, the image generation apparatus 120 separates, from a specific object image obtained by imaging a foreground image which is a specific object, the foreground image by image processing. The specific object is not limited to a human, and may be an object such as a ball.

In the present exemplary embodiment, the virtual viewpoint image corresponding to the virtual viewpoint information is generated from the background image managed in the database and the specific object image. As a method of generating the virtual viewpoint image, model-based rendering (MBR) is used, for example. MBR uses a three-dimensional shape generated based on a plurality of images obtained by imaging an object from a plurality of directions to generate a virtual viewpoint image. Specifically, MBR is a technology that generates an image of a scene to be viewed from a virtual viewpoint by using a three-dimensional shape (e.g., a model) obtained by a three-dimensional shape reconstruction technique such as Shape-from-Silhouette or Multi-View-Stereo (MVS). As the method of generating the virtual viewpoint image, a rendering technique other than MBR may be used. The generated virtual viewpoint image is transmitted to the terminal apparatus 130 via the LAN cable or the like.

The terminal apparatus 130 is used as a terminal to control a virtual viewpoint. Examples of the terminal apparatus 130 include a personal computer (PC) and a tablet. A controller 131 is, for example, a mouse, a keyboard, a 6-axis controller, or a touch panel, and a user operates the controller 131. The user designates a playback time and issues an instruction to move a virtual viewpoint position via the controller 131. The terminal apparatus 130 displays a virtual viewpoint image received from the image generation apparatus 120 on a screen 132. The terminal apparatus 130 converts the user operations input via the controller 131 into playback time information and information about an instruction to move the virtual viewpoint position (e.g., an instruction about a movement amount and a movement direction) and transmits the information to the image generation apparatus 120.

The playback time and the instruction to move the virtual viewpoint position are not limited to a playback time and a virtual viewpoint position in a continuous movement, and a movement to a predetermined virtual viewpoint position, such as a front position or a back position of an object in a virtual space, or a position looking down from above, is also possible. It is also possible to move instantly to a certain time by setting the time beforehand as the playback time.

Figure 3:
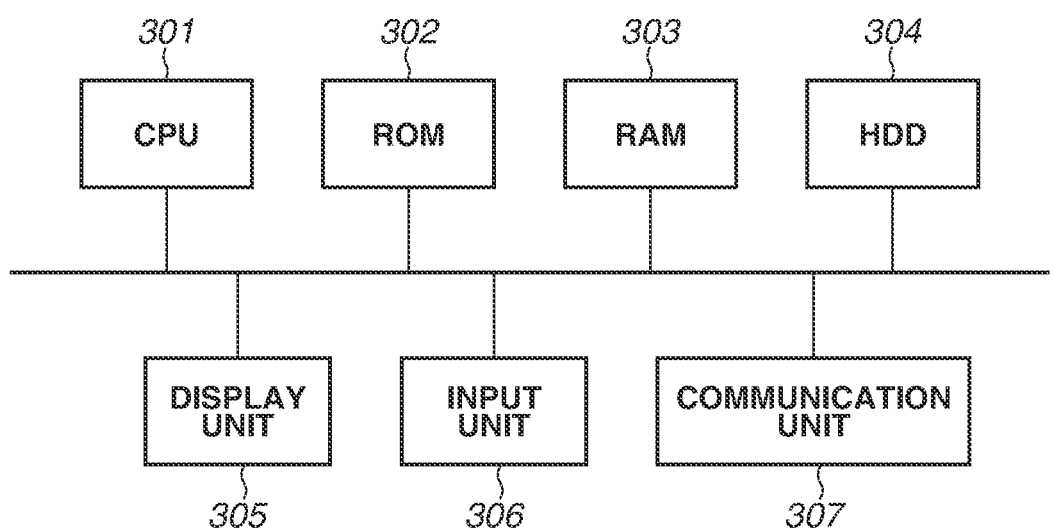
FIG. 3 is a diagram illustrating a hardware configuration of an image generation apparatus.

FIG. 3 is a diagram illustrating a hardware configuration of the image generation apparatus 120.

The image generation apparatus 120 includes a central processing unit (CPU) 301, a read only memory (ROM) 302, a random access memory (RAM) 303, a hard disk drive (HDD) 304, a display unit 305, an input unit 306, and a communication unit 307. The CPU 301 is a control unit including a processor that reads out a control program stored in the ROM 302 and executes various kinds of processing. The RAM 303 is a memory that is used as a temporary storage area, such as a main memory or a work area, for the CPU 301. The HDD 304 is a storage medium storing various data, various programs, and the like. The display unit 305 is a display member, such as a liquid crystal display or a light emitting diode (LED) display, for displaying various kinds of information. The input unit 306 is an operation member that receives various operations performed by the user and includes a keyboard and a mouse. The communication unit 307 is an interface for processing of communication with an external apparatus, such as the image capturing apparatus 110, via a network. For example, the communication unit 307 communicates with the external apparatus in accordance with a wired communication standard, such as Ethernet (registered trademark), or a wireless communication standard such as Institute of Electrical and Electronics Engineers (IEEE) 802.11.

The CPU 301 reads out a program stored in the ROM 302 or the HDD 304 and executes the program, whereby the function and processing, which will be described below, of the image generation apparatus 120 are implemented. The terminal apparatus 130 has a hardware configuration similar to the hardware configuration of the image generation apparatus 120.

Figure 4:
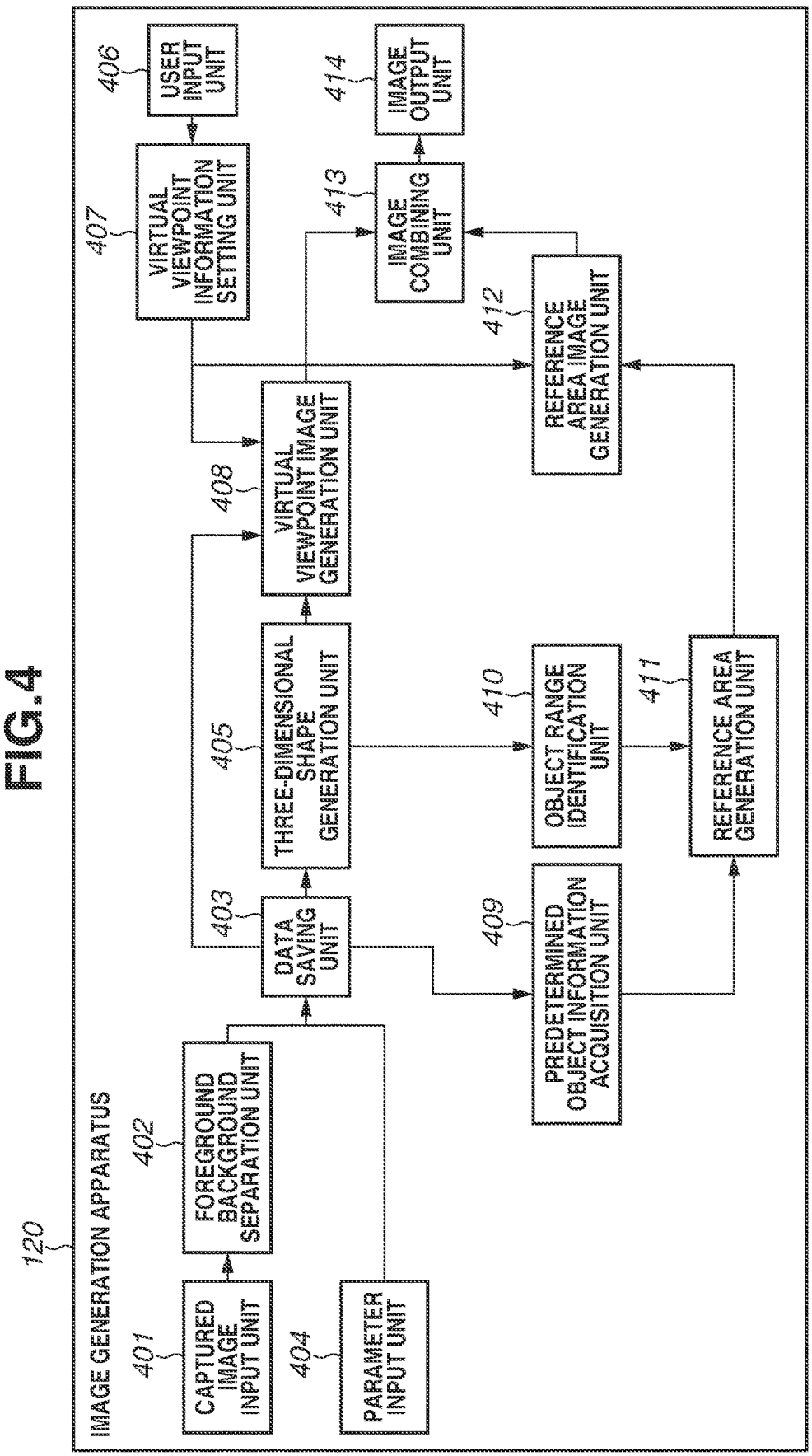
FIG. 4 is a diagram illustrating a functional configuration of the image generation apparatus in a first exemplary embodiment.

FIG. 4 is a diagram illustrating a functional configuration of the image generation apparatus 120.

A captured image input unit 401 converts a transmission signal input from the image capturing apparatus 110 via the LAN cable into captured image data and outputs the captured image data to a foreground background separation unit 402.

The foreground background separation unit 402 holds, as background image data, an image of a scene captured in a state where an object as an image capturing target is not present, such as a state before capturing of an image of the object, from among the captured images input from the captured image input unit 401. In addition, the foreground background separation unit 402 outputs the background image data to a data saving unit 403.

The foreground background separation unit 402 extracts the object, based on a difference between an image captured in a state where the object as the image capturing target is present in an image capturing range and the background image data held in the foreground background separation unit 402 and outputs the result to the data saving unit 403 as foreground image data.

The data saving unit 403 is, for example, a database and saves the foreground image data and the background image data input from the foreground background separation unit 402. The data saving unit 403 outputs the foreground image data to a three-dimensional shape generation unit 405. The data saving unit 403 also outputs the foreground image data and the background image data to be used for rendering to a virtual viewpoint image generation unit 408. In addition, the data saving unit 403 holds camera parameter information input from a parameter input unit 404, and outputs the camera parameter information to the three-dimensional shape generation unit 405 and the virtual viewpoint image generation unit 408.

The parameter input unit 404 receives camera parameter information that is parameter information set beforehand to generate a virtual viewpoint image and predetermined object information, such as an object position and shape fixed to an image capturing scene.

The camera parameter information is held beforehand as camera position information about a plurality of the image capturing apparatuses 110 installed beforehand at predetermined positions surrounding an object and camera setting information on, for example, focal lengths of the image capturing apparatuses 110.

In addition, information indicating, for example, the shape and position of a home base is held beforehand as the predetermined object information.

While, in the present exemplary embodiment, various pieces of the information are input via an external connection device, such as a universal serial bus (USB) memory (not illustrated), the user can directly input the information into the image generation apparatus 120 via the keyboard or the like.

The parameter input unit 404 outputs the input camera parameter information and the input predetermined object information to the data saving unit 403.

The three-dimensional shape generation unit 405 estimates an object shape by using the foreground image data and the camera parameter information input from the data saving unit 403. The three-dimensional shape generation unit 405, uses a three-dimensional shape reconstruction technique, such as Shape-from-Silhouette, to generate object three-dimensional shape information. The three-dimensional shape generation unit 405 outputs the object three-dimensional shape information to the virtual viewpoint image generation unit 408 and an object range identification unit 410.

A user input unit 406 converts a transmission signal input from the terminal apparatus 130 via the LAN cable into user input data. In a case where the user input data is the playback time information and the virtual viewpoint information, the user input unit 406 outputs the playback time information and the virtual viewpoint information to a virtual viewpoint information setting unit 407.

Based on the playback time information and the virtual viewpoint information input from the user input unit 406, the virtual viewpoint information setting unit 407 updates the current position, direction, and playback time in a virtual space.

Then, the virtual viewpoint information setting unit 407 outputs the playback time information and the virtual viewpoint information to the virtual viewpoint image generation unit 408 and a reference area image generation unit 412. The origin of the virtual space has been set beforehand at the center of a sports venue, for example.

The virtual viewpoint image generation unit 408 receives the virtual viewpoint information from the virtual viewpoint information setting unit 407. The virtual viewpoint image generation unit 408 also receives the captured image data from the data saving unit 403. The virtual viewpoint image generation unit 408 also receives the camera parameter information from the data saving unit 403. The virtual viewpoint image generation unit 408 also receives the three-dimensional shape information from the three-dimensional shape generation unit 405 and performs rendering processing on the three-dimensional shape information about a view from a virtual viewpoint by using color information based on the camera parameter information and the captured image data. The virtual viewpoint image generation unit 408 outputs the rendered virtual viewpoint image to an image combining unit 413.

The rendering is, for example, coloration processing to color the three-dimensional shape of the object viewed from a virtual viewpoint position by using color information on image data captured by real cameras, i.e., image capturing apparatuses 110, at the corresponding time. Specifically, first, in a state in which the object based on the three-dimensional shape information is visible from the virtual viewpoint, and in a case where a position of an image capturing apparatus 110 is within a predetermined range from the position of the virtual viewpoint, a rendering image of the object is generated using foreground image data acquired by the image capturing apparatus 110 as the color of a shape. Next, the background image data separately saved in the data saving unit 403 and the rendering image of the object imaged from the virtual viewpoint position is combined to generate a virtual viewpoint image.

A predetermined object information acquisition unit 409 acquires predetermined object information indicating the shape and position of the home base from among pieces of parameter information saved in the data saving unit 403 beforehand via the parameter input unit 404. The predetermined object information acquisition unit 409 outputs the input predetermined object information to a reference area generation unit 411.

The object range identification unit 410 acquires three-dimensional shape information that is from among pieces of the three-dimensional shape information input from the three-dimensional shape generation unit 405 and is generated within a predetermined area. In the present exemplary embodiment, the predetermined area is an area inside a batter's box of baseball, and the object range identification unit 410 acquires three-dimensional shape information about a batter standing in the batter's box. Next, the object range identification unit 410 generates upper limit position information that is a piece of the three-dimensional shape information about the batter and indicates a horizontal position corresponding to the midpoint between the shoulder part and the waist part of the batter as the upper limit in the height direction. Further, the object range identification unit 410 generates lower limit position information that indicates a horizontal position corresponding to the hollow-beneath-knee part of the batter as the lower limit in the height direction. The object range identification unit 410 outputs object range information containing the upper limit position information and the lower limit position information to the reference area generation unit 411. In the detection of the specific parts of the batter, the shoulder, waist, and hollow-beneath-knee parts are identified by estimation using a method of estimating a human skeletal frame based on image analysis and shape analysis. The detection method is not limited to this example, and the object range identification unit 410 may calculate position information about the parts by measuring the batter as an individual beforehand using a measurement device or the like and hold the calculated position information.

The reference area generation unit 411 generates reference area information corresponding to a strike zone by using the predetermined object information input from the predetermined object information acquisition unit 409 and the object range information input from the object range identification unit 410. Specifically, the position and shape of the home base are identified from position information and shape information about the home base included in the predetermined object information.

Within the range of the height based on the upper limit position information and the lower limit position information contained in the object range information, the reference area information corresponding to a pentagonal prism having a home base shape as the base is generated above the home base. The generated reference area information is output to the reference area image generation unit 412.

The reference area image generation unit 412 adds color information or the like to the boundary and/or the inside of the reference area to assist a viewer to recognize the area of the strike zone, at the position indicated by the reference area information input from the reference area generation unit 411. Thus, a reference area image captured from a viewpoint position based on the virtual viewpoint information input from the virtual viewpoint information setting unit 407 is generated. The generated reference area image is output to the image combining unit 413.

The image combining unit 413 generates a virtual viewpoint combined image obtained by combining the virtual viewpoint image input from the virtual viewpoint image generation unit 408 and the reference area image input from the reference area image generation unit 412. Then, the image combining unit 413 outputs the generated virtual viewpoint combined image to an image output unit 414. The display mode of the reference area image may be, for example, a translucent mode to allow the user to recognize the positional relationship between the batter of the virtual viewpoint image and the strike zone of the reference area image.

The image output unit 414 converts the virtual viewpoint combined image input from the image combining unit 413 into a transmission signal transmittable to the terminal apparatus 130 and outputs the transmission signal to the terminal apparatus 130.

Next, an example of operation of the image generation apparatus 120 will be described.

Figure 5:
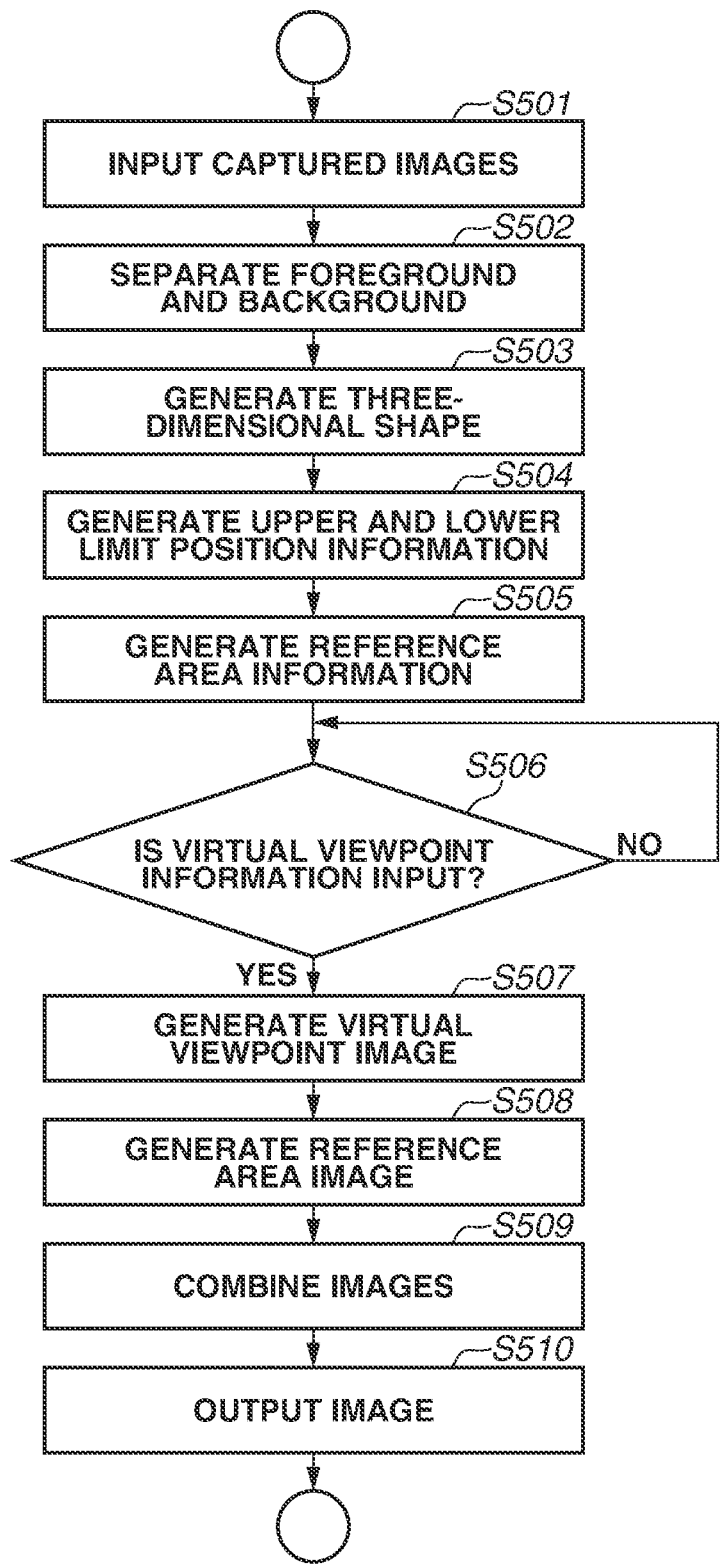
FIG. 5 is a diagram illustrating a processing procedure of operation of the image generation apparatus in the first exemplary embodiment.

FIG. 5 is a flowchart illustrating the operation of the image generation apparatus 120 according to the present exemplary embodiment. The CPU 301 reads out a program stored in the ROM 302 or the HDD 304 and executes the program to perform the following processing.

In step S501, the captured image input unit 401 inputs images captured by the plurality of the image capturing apparatuses 110. The input captured images are output to the foreground background separation unit 402.

In step S502, the foreground background separation unit 402 saves foreground image data, obtained by extracting an object from images of the object captured during a game, and background image data on a scene where the object is not imaged, in the data saving unit 403.

In step S503, the three-dimensional shape generation unit 405 generates three-dimensional shape of the object, based on camera parameter information saved in the data saving unit 403 and the foreground image data also saved in the data saving unit 403. For example, the three-dimensional shape generation unit 405 generates object shape information (e.g., object three-dimensional shape information) about the object by using a three-dimensional shape reconstruction technique, such as Shape-from-Silhouette. In the present exemplary embodiment, the object shape information contains a plurality of point groups, and each of the points has position information.

In step S504, the object range identification unit 410 generates upper limit position information that is a piece of the three-dimensional shape information about a batter and indicates a horizontal position corresponding to the midpoint between the shoulder part and the waist part of the batter as the upper limit in the height direction. The object range identification unit 410 also generates lower limit position information that indicates a horizontal position corresponding to the hollow-beneath-knee part of the batter as the lower limit in the height direction. The object range identification unit 410 outputs object range information containing the upper limit position information and the lower limit position information to the reference area generation unit 411.

In step S505, the reference area generation unit 411 uses the predetermined object information input from the predetermined object information acquisition unit 409 and the object range information input from the object range identification unit 410 to generate reference area information corresponding to the strike zone. The generated reference area information is output to the reference area image generation unit 412.

In step S506, the virtual viewpoint information setting unit 407 determines whether a virtual camera path containing playback time information and virtual viewpoint information is input via the user input unit 406. In a case where the virtual camera path has not been input due to a state of waiting for reception of the virtual camera path (NO in step S506), the virtual viewpoint information setting unit 407 waits until the virtual camera path is input. In a case where the camera path is input (YES in step S506), the virtual viewpoint information setting unit 407 outputs the virtual camera path to the virtual viewpoint image generation unit 408 and the reference area image generation unit 412.

In step S507, the virtual viewpoint image generation unit 408 receives captured image data from the data saving unit 403 and generates an image of a viewpoint from a virtual viewpoint position, based on the virtual viewpoint information input from the virtual viewpoint information setting unit 407. The virtual viewpoint image generation unit 408 also receives the object three-dimensional shape information from the three-dimensional shape generation unit 405 and performs rendering processing. A virtual viewpoint image obtained by the rendering processing is output to the image combining unit 413.

In step S508, the reference area image generation unit 412 adds color information or the like to the boundary of the reference area and/or the inside of the range of the reference area to assist a viewer to recognize the area of the strike zone, at the position indicated by the reference area information input from the reference area generation unit 411. Thus, a reference area image captured from a viewpoint position based on the virtual viewpoint information input from the virtual viewpoint information setting unit 407 is generated. The generated reference area image is output to the image combining unit 413.

In step S509, the image combining unit 413 combines the virtual viewpoint image input from the virtual viewpoint image generation unit 408 and the reference area image input from the reference area image generation unit 412 to generate a virtual viewpoint combined image and outputs the generated virtual viewpoint combined image to the image output unit 414.

In step S510, the image output unit 414 converts the virtual viewpoint combined image input from the image combining unit 413 into a transmission signal transmittable to the terminal apparatus 130 and outputs the transmission signal to the terminal apparatus 130.

The above described way is the operation that is performed by the image generation apparatus 120.

Figure 6:
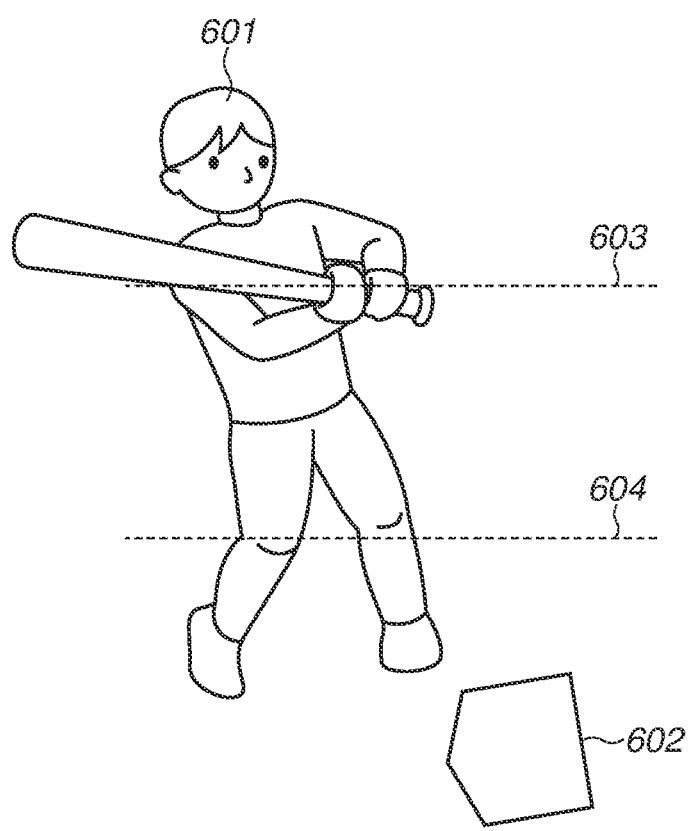
FIG. 6 is a conceptual diagram illustrating a virtual space in the first exemplary embodiment.

FIG. 6 is a conceptual diagram illustrating the virtual space of the present exemplary embodiment. The virtual space generated based on images captured by the image capturing apparatus 110 has a home base 602 disposed at a position based on the predetermined object information and an object 601 generated based on the object shape information. In addition, upper limit position information 603 at a horizontal position corresponding to the midpoint between the shoulder part and the waist part of a batter is indicated as the upper limit in the height direction, and lower limit position information 604 at a horizontal position corresponding to the hollow-beneath-knee part of the batter is indicated as the lower limit in the height direction.

Figure 7:
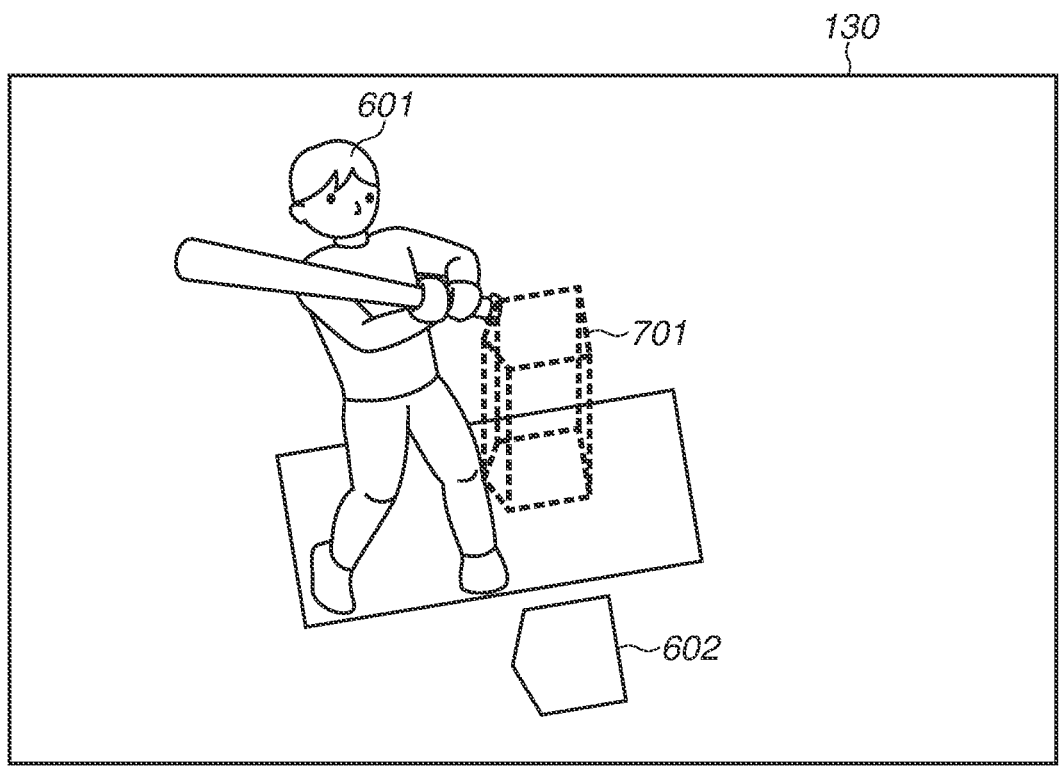
FIG. 7 is a diagram illustrating a screen display example in the first exemplary embodiment.

FIG. 7 is a display example of the virtual viewpoint image in the terminal apparatus 130 in the present exemplary embodiment. In FIG. 7, the virtual viewpoint image has the home base 602 at the position based on the predetermined object information. In FIG. 7, a strike zone 701, which is a pentagonal prism having a home base shape as the base generated based on the upper limit position information 603 corresponding to the midpoint between the shoulder part and the waist part of the batter and the lower limit position information 604 corresponding to the hollow-beneath-knee part of the batter, is combined with the virtual viewpoint image and displayed. On the virtual viewpoint image, the user can identify the strike zone. While, in the present exemplary embodiment, an example in which the boundary of the strike zone is indicated by a broken line is described as the display mode of the strike zone, the display mode of the strike zone is not limited to this example. For example, color may be added to the inside of an area including the boundary, and the strike zone may be displayed in a translucent manner. While, in the present exemplary embodiment, the strike zone is expressed by the pentagonal prism, other solid may be used as long as the strike zone is three-dimensionally displayed.

As described above, according to the first exemplary embodiment, the strike zone is displayed in the virtual viewpoint image, whereby the strike zone is easily identified even in a case where the batter is viewed from various positions and directions.

A second exemplary embodiment is an example in which determination of whether a ball object has passed through the strike zone is performed, and in a case where the ball object has passed through the strike zone, the display mode in the reference area is changed.

Figure 8:
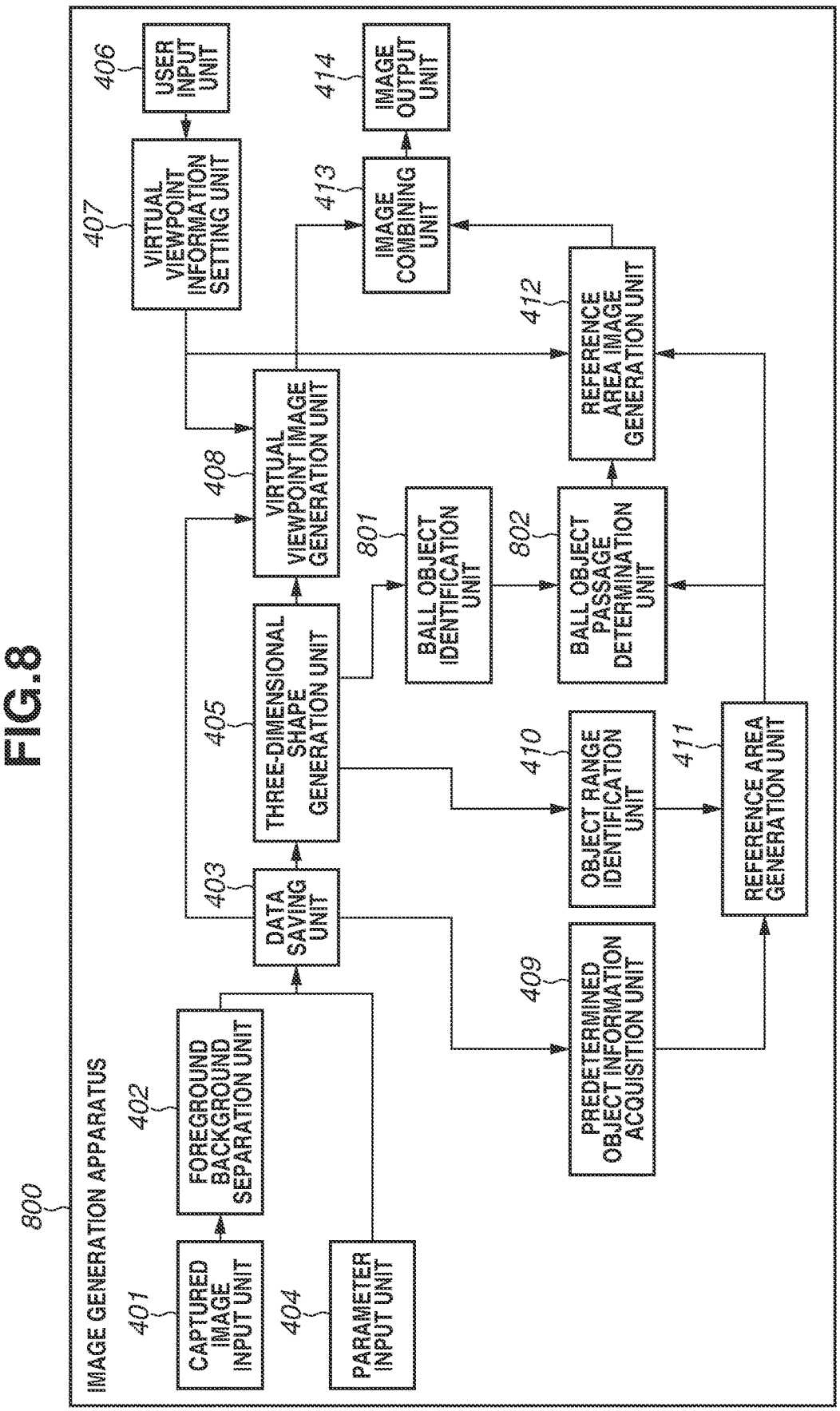
FIG. 8 is a diagram illustrating a functional configuration of an image generation apparatus in a second exemplary embodiment.

FIG. 8 is a diagram illustrating a functional configuration of an image generation apparatus 800 according to the present exemplary embodiment. The image generation apparatus 800 includes the following functional components, in addition to the configuration of the image generation apparatus 120 according to the first exemplary embodiment described with reference to FIG. 4.

A ball object identification unit 801 acquires ball object three-dimensional shape information from among pieces of the three-dimensional shape information input from the three-dimensional shape generation unit 405. In the ball object identification, three-dimensional shape information similar to ball shape information based on a ball size held beforehand is detected as a ball object from among pieces of the three-dimensional shape information within a surrounding area including the strike zone. Further, the ball object identification unit 801 outputs the ball object three-dimensional shape information to a ball object passage determination unit 802.

The ball object passage determination unit 802 performs determination of whether a ball has passed through the strike zone, based on the ball object three-dimensional shape information input from the ball object identification unit 801 and the reference area information input from the reference area generation unit 411. In the determination of the passage through the strike zone, three-dimensional position information of the reference area information indicating the strike zone and three-dimensional position information indicating the ball object are compared, and determination of whether there is contact between the ball and the strike zone is performed, whereby determination of whether the ball has passed through the strike zone is performed. In a case where, due to the image capturing frame rate of an image capturing apparatus 110, an image at the moment when the ball passes through the strike zone has been failed to be captured, the ball object passage determination unit 802 estimates a ball object trajectory by using the time of capturing an image of the ball and the ball object three-dimensional shape information about the ball. In this case, the ball object passage determination unit 802 uses the estimated trajectory of the ball object to determine whether the ball has passed through the strike zone.

In a case where the ball object passage determination unit 802 determines that the ball has passed through the strike zone, the ball object passage determination unit 802 outputs a display mode setting change instruction to the reference area image generation unit 412 to change the display mode.

Figure 9:
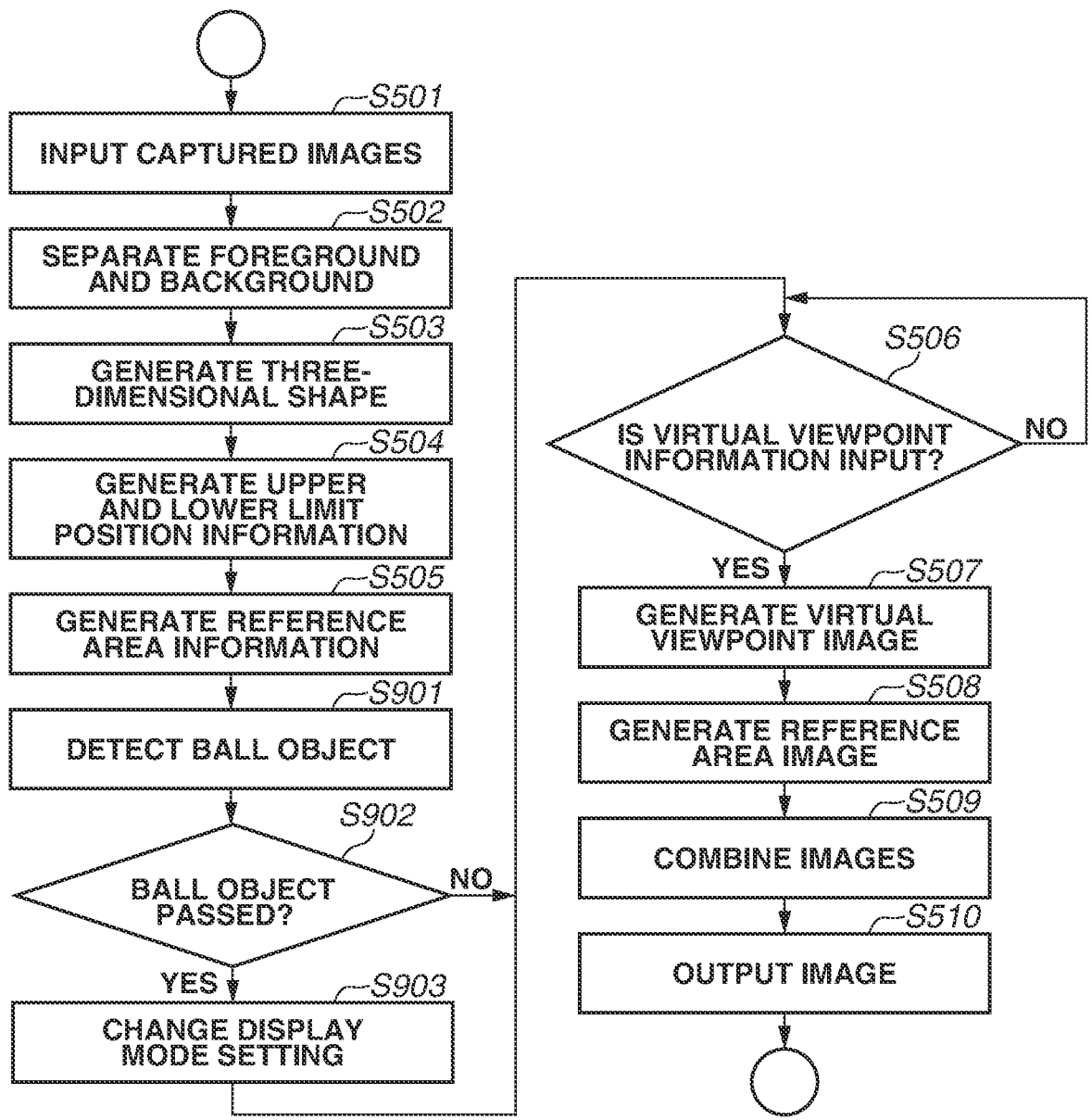
FIG. 9 is a diagram illustrating a processing procedure of operation of the image generation apparatus in the second exemplary embodiment.

FIG. 9 is a flowchart illustrating image processing that is performed by the image generation apparatus 800 according to the present exemplary embodiment. Step S501 to step S505 are similar to those in FIG. 5, and thus the redundant description will be omitted.

In step S901, the ball object identification unit 801 acquires the ball object three-dimensional shape information from among pieces of the three-dimensional shape information input from the three-dimensional shape generation unit 405. In the ball object identification, three-dimensional shape information similar to ball shape information based on a ball size held beforehand is detected as a ball object from among pieces of the three-dimensional shape information in a surrounding area including the strike zone. Further, the ball object identification unit 801 outputs the ball object three-dimensional shape information to the ball object passage determination unit 802.

In step S902, the ball object passage determination unit 802 performs determination of whether the ball has passed through the strike zone, based on the ball object three-dimensional shape information and the reference area information. The ball object three-dimensional shape information is data input from the ball object identification unit 801, and the reference area information is data input from the reference area generation unit 411.

In a case where the ball object passage determination unit 802 determines that the ball has passed through the strike zone (YES in step S902), the processing proceeds to step S903. In step S903, the ball object passage determination unit 802 outputs a display mode setting change instruction to the reference area image generation unit 412 to change the display mode. In a case where the ball object passage determination unit 802 determines that the ball has not passed through the strike zone (NO in step S902), the processing proceeds to step S506.

Figure 10:
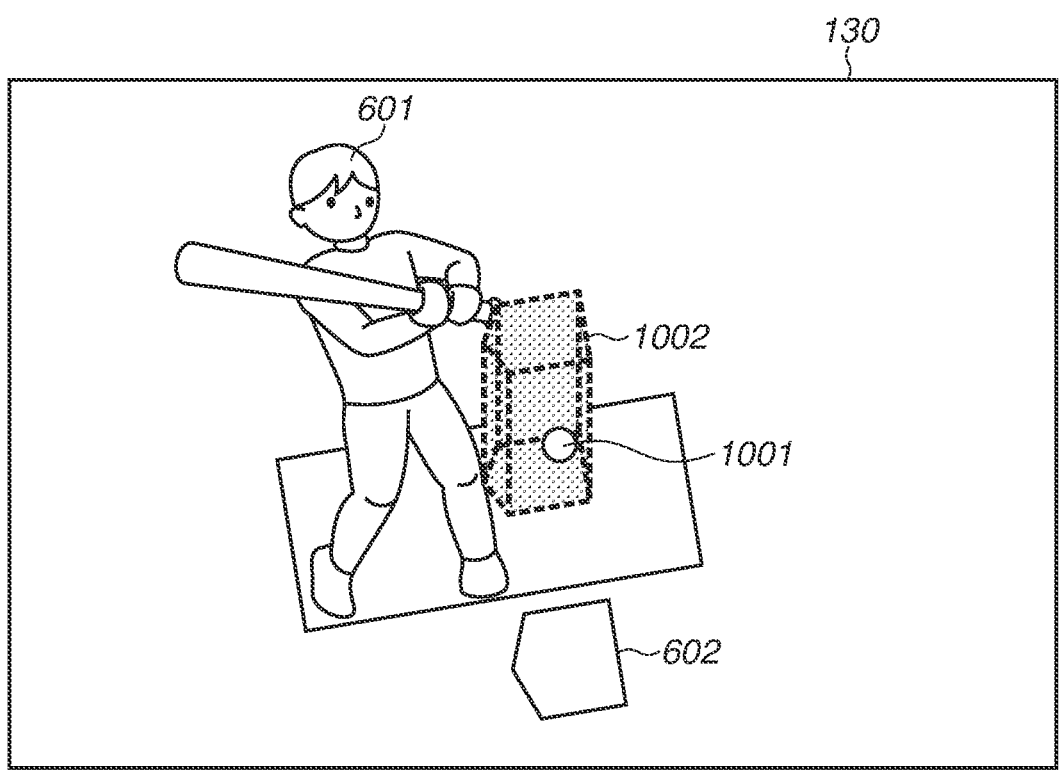
FIG. 10 is a diagram illustrating a screen display example in the second exemplary embodiment.

FIG. 10 is an example of a virtual viewpoint image displayed on the terminal apparatus 130. In this display example, in a case where a ball object 1001 has passed through a strike zone 1002, the display mode of the strike zone 1002 is changed from the display mode in which only the boundary of the strike zone 701 is displayed as illustrated in FIG. 7 to a display mode using a dot pattern. With this display mode change, the user, such as officials or viewers, can easily determine whether a strike has been thrown by a pitcher.

As described above, according to the present exemplary embodiment, the display mode of the strike zone is changed at the time of a strike judgement, whereby the strike judgement is easily performed even in the virtual viewpoint image.

In a case where an image at the moment when the ball has passed through the strike zone has failed to be captured, the ball object passage determination unit 802 may add a determination result indicating "determination impossible" because correct determination cannot be performed. In this case, texts indicating that determination is impossible is also displayed in the screen illustrated in FIG. 10.

In a third exemplary embodiment, a description will be given of an example case in which the range of the strike zone is changed based on a result of a judgement made by an umpire.

Figure 11:
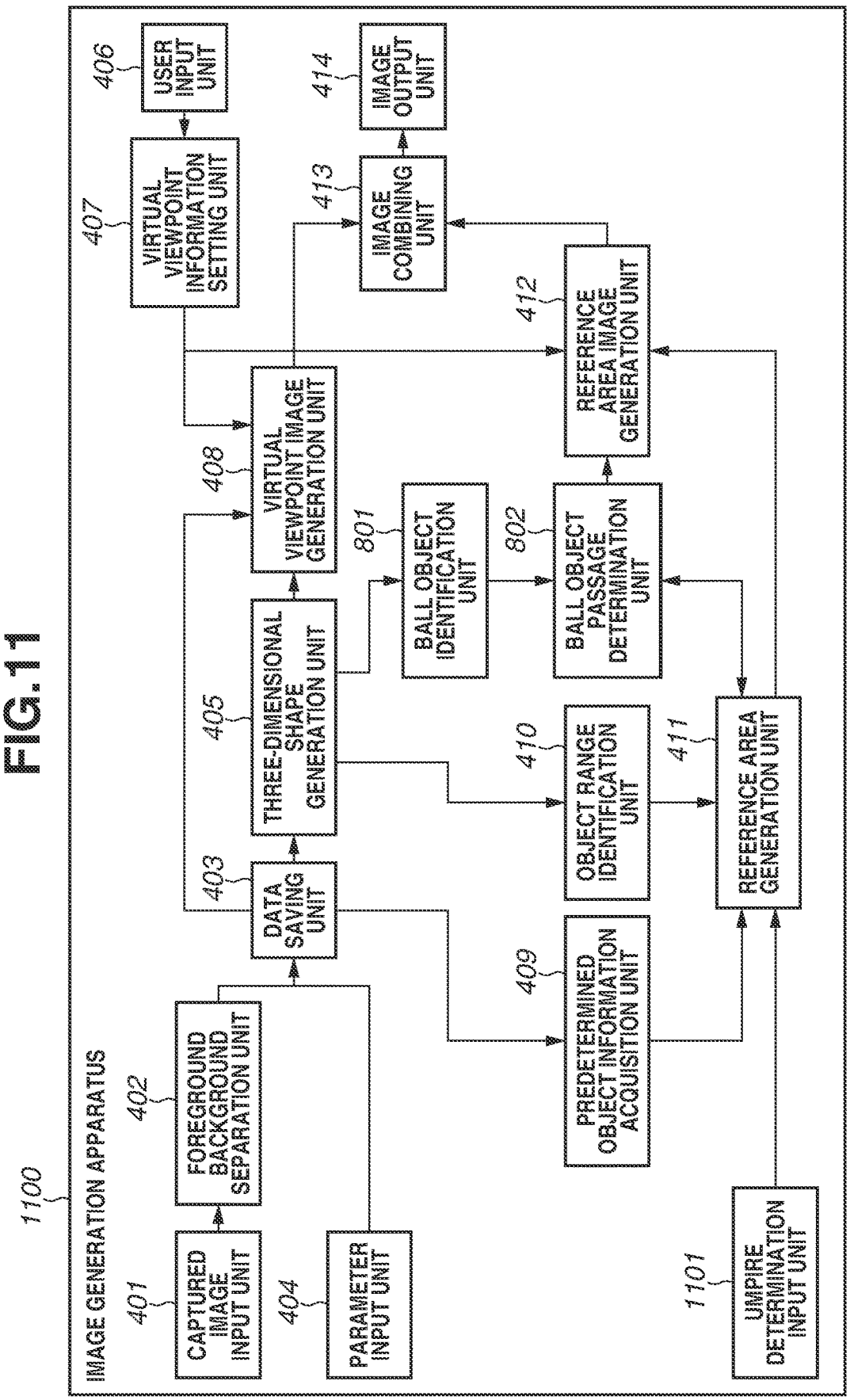
FIG. 11 is a diagram illustrating a functional configuration of an image generation apparatus in a third exemplary embodiment.

FIG. 11 is a diagram illustrating a functional configuration of an image generation apparatus 1100 according to the present exemplary embodiment. The image generation apparatus 1100 includes the following function, in addition to the configuration of the image generation apparatus 800 according to the second exemplary embodiment described with reference to FIG. 8.

An umpire determination input unit 1101 receives information about a judgement made by a chief umpire as umpire determination information via an input terminal (not illustrated) and outputs the umpire determination information to the reference area generation unit 411. As the umpire determination information, information about whether a ball is a strike or ball and time information indicating the time of the determination are input by user operations and the like.

The reference area generation unit 411 changes the shape of the reference area, based on the umpire determination information input from the umpire determination input unit 1101, the passage determination information input from the ball object passage determination unit 802, and ball object position information.

For example, in a case where the umpire determination information indicates that the ball is a strike, but the passage determination information of the ball object passage determination unit 802 indicates determination that a ball has not passed through the strike zone, the reference area is changed to come into contact with the ball object three-dimensional shape. Reference area information indicating the changed reference area is generated and subsequently output to the reference area image generation unit 412.

Figure 12:
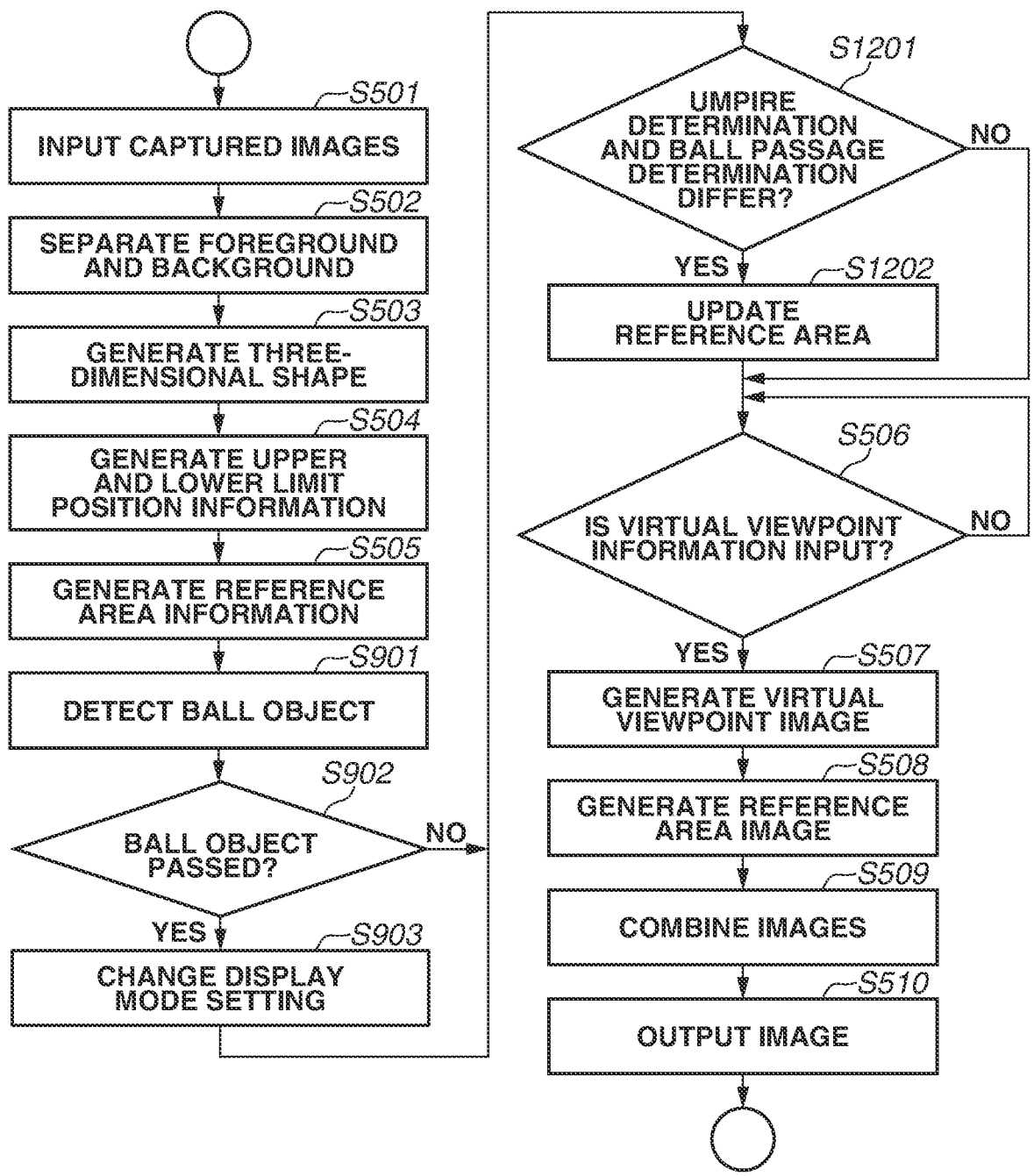
FIG. 12 is a diagram illustrating a processing procedure of operation of the image generation apparatus in the third exemplary embodiment.

FIG. 12 is a flowchart illustrating image processing that is performed by the image generation apparatus 1100 according to the present exemplary embodiment. Step S501 to step S903 and step S506 to step S510 are similar to those in FIG. 9, and thus the redundant description will be omitted.

In step S1201, the reference area generation unit 411 uses the umpire determination information, the passage determination information, and the ball object three-dimensional shape information to determine whether the umpire determination and ball passage determination are different from each other. The umpire determination information is data input from the umpire determination input unit 1101, and the passage determination information is data input from the ball object passage determination unit 802. In a case where the umpire determination and the ball passage determination are different from each other, i.e., in a case where the umpire determination information indicates a strike but the passage determination information of the ball object passage determination unit 802 indicates determination that a ball has not passed through the strike zone (YES in step S1201), the processing proceeds to step S1202. In a case where the umpire determination and the ball passage determination coincide with each other (NO in step S1201), the processing proceeds to step S506.

In step S1202, the reference area generation unit 411 updates the reference area. For example, the reference area is changed to come into contact with the ball object three-dimensional shape.

Figure 13:
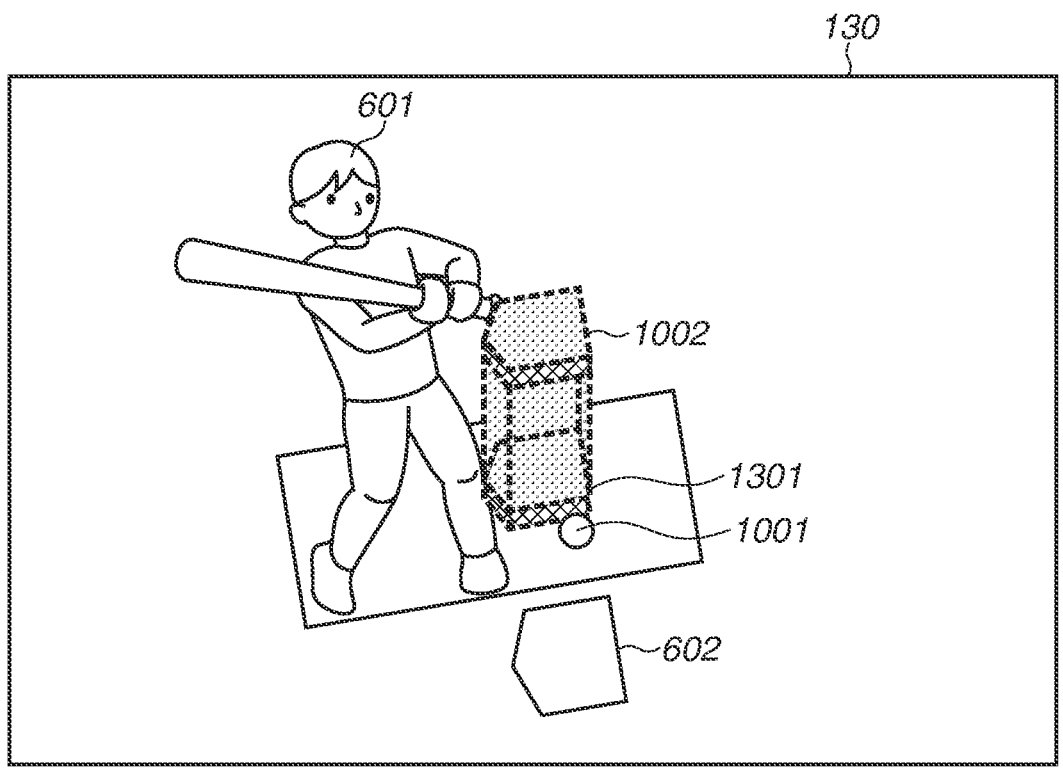
FIG. 13 is a diagram illustrating a screen display example in the third exemplary embodiment.

FIG. 13 is an example of a virtual viewpoint image displayed on the terminal apparatus 130.

In a case where the ball object 1001 has not passed through the strike zone 1002 but the umpire determination indicates a strike, the reference area is updated such that the area of the strike zone comes into contact with the ball object at the time concerned.

For example, the display mode of the strike zone 1002 is updated and a strike zone 1301 is displayed as a new strike zone, i.e., a strike zone reflecting the umpire determination can be generated by changing the display mode.

As described above, according to the present exemplary embodiment, the strike zone is corrected in consideration of a judgement made by an umpire, whereby strike determination factoring in the umpire judgement is easily performed.

The present invention can also be implemented by processing for supplying a program for implementing one or more functions in the above-described exemplary embodiments to a system or apparatus via a network or a storage medium and causing one or more processors in a computer of the system or apparatus to read and execute the program.

The present invention can also be implemented by a circuit (for example, an application specific integrated circuit (ASIC)) that implements the one or more functions.

The present invention is not limited to each of the above-described exemplary embodiments alone and can be embodied by modifying components without departing from the scope of the spirit thereof in an implementation phase. In addition, various inventions can be formed by appropriately combining a plurality of components disclosed in the above-described exemplary embodiments. For example, some components may be deleted from all the components of the exemplary embodiments. Further, components used in different exemplary embodiments may be appropriately combined.

In the above-described exemplary embodiments, at least one of A and B may be only A, may be only B, and may be A and B.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-190839, filed Nov. 29, 2022, which is hereby incorporated by reference herein in its entirety.

What is claimed is:

1. An image processing system comprising:
   one or more memories storing instructions; and
   one or more processors executing the instructions to:
   capture images of a predetermined range by using a plurality of image capturing units,
   generate object shape information based on a plurality of pieces of image data obtained by the plurality of image capturing units,
   identify a first position and a second position of the object shape information to calculate object range information,
   detect a ball object,
   acquire object information containing a position and a shape of the ball object,
   generate reference area information based on the object range information and the object information,
   update a display mode of a reference area that is based on the reference area information,
   determine whether the ball object has passed through a range of the reference area, and in a case where the ball object has passed through the range of the reference area, change the display mode of the reference area,
   input a result of an umpire judgement, and
   change, in a case where the umpire judgement and the determination about passage of the ball object are different from each other, the range of the reference area.

2. The image processing system according to claim 1, wherein the reference area is updated to come into contact with the ball object, based on information about a position of the ball object at a time coinciding with a time of the umpire judgement.

3. A control method for an image processing system, the control method comprising:
   capturing images of a predetermined range by using a plurality of image capturing units,
   generating object shape information based on a plurality of pieces of image data obtained by the plurality of image capturing units,
   identifying a first position and a second position of the object shape information to calculate object range information,
   detecting a ball object,
   acquiring object information containing a position and a shape of the ball object,
   generating reference area information based on the object range information and the object information,
   updating a display mode of a reference area that is based on the reference area information,
   determining whether the ball object has passed through a range of the reference area, and in a case where the ball object has passed through the range of the reference area, change the display mode of the reference area,
   inputting a result of an umpire judgement, and
   changing, in a case where the umpire judgement and the determination about passage of the ball object are different from each other, the range of the reference area.

4. A non-transitory storage medium storing a program for causing an image processing system to execute a control method, the control method comprising:
   capturing images of a predetermined range by using a plurality of image capturing units,
   generating object shape information based on a plurality of pieces of image data obtained by the plurality of image capturing units,
   identifying a first position and a second position of the object shape information to calculate object range information, detecting a ball object,
acquiring object information containing a position and a shape of the ball object, and
generating reference area information based on the object range information and the predetermined object information,
updating a display mode of a reference area that is based on the reference area information,
determining whether the ball object has passed through a range of the reference area, and in a case where the ball object has passed through the range of the reference area, change the display mode of the reference area,
inputting a result of an umpire judgement, and
changing, in a case where the umpire judgement and the determination about passage of the ball object are different from each other, the range of the reference area.

\* \* \* \* \*